United States Patent Office 2,886,489
Patented May 12, 1959

2,886,489

PREPARATION OF ELASTASE

Norman H. Grant and Kenneth C. Robbins, Chicago, Ill., assignors to Armour and Company, Chicago, Ill., a corporation of Illinois No Drawing. Application October 3, 1955
Serial No. 538,242

17 Claims. (Cl. 195—67)

This invention relates to the preparation of an elastolytic enzyme substance, and more particularly to a process for purifying pancreatic elastase.

Elastase is an enzyme which effects the dissolution of elastin (elastolysis), and consequently may also be designated as an elastolytic enzyme. Elastin is one of the proteinaceous substances responsible for the elasticity of the walls in blood vessels and of the skin. The solubilizing action of this enzyme upon an elastin substrate has not been too well characterized, but it is believed to involve the transforming of elastin from the fibrous into the globular form.

The processes heretofore employed for preparing elastase, being directed to the production of small quantities of enzyme for laboratory and clinical experimentation, involve expensive and laborious purification steps resulting in a relatively low yield of product. Consequently, the processes of the prior art are not adaptable to the large scale manufacture of elastase for commercial purposes.

Therefore it is an object of this invention to provide a method of preparing elastase which is adaptable to large scale manufacturing operations. Another object is the provision of a process for obtaining high purity elastase in a significantly improved yield which is reproducible from batch to batch. A further object is the provision of a method for preparing elastase from pancreas tissue of a purity suitable for parenteral administration. Other objects and advantages of this invention will become apparent as the specification proceeds.

In one aspect of this invention purification of elastase can be obtained by contacting a crude aqueous concentrate of elastase substance with a weak cation exchanger to produce an adsorbate of such elastase substance. This elastase substance may then be eluted from the weak cation exchanger with an aqueous saline solution. For the purposes of this invention "elastase substance" means either the pro-enzyme or active form of the elastolytic enzyme. We have discovered that elastase is contained homeostatically in the pancreas and pancreatic juice as the inactive precursor. The pro-elastase may be converted to elastase by trypsin in a manner similar to the activation of chymotrypsinogen to chymotrypsin. We have further found that, in the presence of trypsinogen, pro-elastase may be activated by a duodenal factor, presumably enterokinase. This mode of activation may involve the conversion of the trypsinogen to trypsin by enterokinase and the consequent activation of pro-elastase by the trypsin. In the process of this invention pro-elastase may be activated prior to treatment with the weak cation exchanger by including enterokinase or trypsin in the crude aqueous concentrate of the enzyme, or subsequent to elution of the elastase substance from the weak cation exchanger by treatment with trypsin.

The elastolytic potency of the enzyme substance prepared by the process of this invention can be determined upon elastin derived from aorta tissue. This elastin substrate can be prepared by boiling subdivided aortic tissue in 0.1 N alkali solution for a period of one hour, neutralizing with acid and washing with water. This alkaline hydrolysis operation may be repeated, and the resulting product dried with acetone. The analysis of the enzyme can be obtained by mixing 1 cc. of water containing 20 mg. of dry elastin with 3 cc. of pH 10.3, 0.2 M carbonate buffer solution and 1 cc. of water having the elastase substance dissolved therein. The resulting mixture is incubated at a temperature of 37° C. for a period of 30 minutes, and thereafter the elastolysate is chilled to a temperature of about 0° C. After settling for about 5 minutes, the undissolved elastin substrate is separated from the supernatant liquid by filtration using S and S #595 filter paper. The nitrogen content of the filtrate thereupon obtained can be determined by the biuret protein procedure. The net amount of soluble protein can be calculated as the activity of the enzyme substance, i.e., the difference between the protein content of the elastin substrate and that of the undissolved elastin in the elastolysate is the activity of the enzyme substance. This assay value can be expressed as elastolytic units, wherein one unit is the amount of enzyme required to solubilize 1 mg. of elastin under the analytical conditions.

The preferred practice of this invention involves contacting subdivided pancreas tissue with an aqueous solution to obtain an aqueous extract containing the elastase substance. The pancreas glands may be subdivided by a procedure such as hashing, grinding or comminuting, and then defatted by solvent extraction employing such solvents as acetone, xylene and petroleum hydrocarbon fractions. The conversion of pro-elastase to elastase may be obtained by including in the pancreas extraction slurry comminuted porcine duodenal tissue in the amount of about 10% by weight. Also, this extraction slurry may contain an inorganic salt, e.g. sodium chloride, to facilitate solubilization of elastase. The extraction of the elastase substance can be completed in about 2 to 3 hours at a temperature of 25° C., and in about 10 to 16 hours at a temperature of 0° C. The enzyme extract can be separated from the tissue residue, after completion of the extraction, by a method such as centrifugation or filtration, and the separated residue may be discarded or employed in producing other pancreatic factors.

Although mammalian pancreas tissue, such as hog and beef pancreas, is the preferred source of this elastase substance, the advantages of this invention can be achieved with pancreatic juice or other crude aqueous concentrates of the enzyme obtained from elastase-bearing tissue.

Any crude aqueous concentrate of elastase substance, such as the aforementioned pancreatic juice and pancreas extract, can be subjected to the adsorption-elution procedure of this invention to obtain a purified enzyme product. In this purification procedure, adsorption of the elastase substance may be obtained on any weak cation exchanger, such as weakly ionized carboxylic acid resins, e.g. XE–97, XE–64 and IRC–50 ion exchange resins (manufactured by Rohm and Haas). We have found that, although this elastase substance can be adsorbed onto the cation exchanger at a pH within the range of 4.5 to 5.0 and an ionic strength of not more than 0.4, especially desirable adsorption of the enzyme results at a pH of about 4.7 and an ionic strength of about 0.05. The temperature for obtaining adsorption of the elastase substance onto the cation exchanger may be about 25° C.

The weak cation exchanger may be equilibrated to these adsorption conditions by, for example, contacting such exchanger with pH 4.7, 0.05 M sodium acetate-acetic acid buffer solution. The equilibration of the exchanger can be obtained by suspending such exchanger in the buffer solution, and after the exchanger has obtained an equilibrium condition with the buffer, the bulk of the solution can be separated from the exchanger by decantation. The crude aqueous concentrate of the enzyme can be adjusted to the adsorption conditions by, for example, dilution with water to an ionic strength of less than 0.4, when the ionic strength of such aqueous concentrate is greater than 0.4. On the other hand, this crude aqueous concentrate of the enzyme can be mixed with the equilibrated exchanger and water in an amount sufficient to reduce the ionic strength of the resulting mixture to less than 0.4 to achieve the adsorption conditions.

The preparation of the elastase substance adsorbate may be obtained by mixing the equilibrated cation exchanger and the equilibrated crude aqueous enzyme concentrate in a batch type procedure, and thereafter separating the exchanger from the supernatant liquid by centrifugation, filtration, etc. Alternatively, the equilibrated exchanger may be packed into a cylindrical column, and the equilibrated crude aqueous enzyme concentrate passed through such column at a rate of flow such as to adsorb the elastase substance onto the exchanger.

The elastase substance may be eluted from the cation exchanger at a pH between 4.5 and 5.0 and an ionic strength of at least 0.4. Better elution of the enzyme can be achieved at a pH of about 4.7, and an ionic strength of from 0.8 to 1.5, and especially desirable results can be obtained at an ionic strength of about 1.2. This elution step may be carried out by contacting the cation exchanger, having the elastase substance adsorbed thereon, and an aqueous saline solution having an ionic strength of at least 1.0. Better results are obtained when the ionic strength of this aqueous eluant is about 2.0. The contact between cation exchanger and eluant to obtain elution of the elastase substance may be achieved by such procedures as the aforementioned batch-type and columnar systems. The critical ionic strength conditions employed in this adsorption-elution procedure can be obtained with any inorganic salt which is inert with respect to the elastolytic enzyme.

The eluted elastase substance may be further purified by repeating the aforementioned adsorption-elution procedure. Also, this eluate of the elastase substance may be purified by fractionation at substantially complete saturation with ammonium sulfate. We have found that the eluted elastase substance is substantially soluble at an ammonium sulfate saturation of less than 0.8, but that it is insolubilized at an ammonium sulfate saturation of more than about 0.8. In the alternative, the eluate of the elastase substance may be fractionated at an alcohol concentration of at least about 65% by volume and a temperature of —5° C. Although we have found that this eluated elastase substance is substantially insoluble at an alcohol concentration of about 65% by volume, more complete precipitation thereof is obtained at an alcohol concentration of about 80% by volume and a temperature of about —5° C. As alcohols suitable for fractionating this elastase eluate we mention, for example, ethanol and methanol. The precipitated elastase substance may be separated from the supernatant liquid by centrifugation, filtration, etc., and after dialyzing to remove residual salt or solvent therefrom, if desired, the enzyme may be dehydrated. Preferably, dehydration of the purified elastase is obtained by lyophilization.

As mentioned hereinbefore, the eluted elastase substance, when obtained in pro-enzyme form, may be activated with trypsin. This activation may be produced by mixing with the aqueous pro-elastase eluate a small amount of trypsin, and maintaining the resulting solution at room temperature and a neutral pH for about 20 minutes.

This invention can be further illustrated by the following examples:

Example I

Pancreas tissue, having been subdivided by hashing, defatted by solvent extraction and dehydrated, in the amount of 400 gms., was mixed with 2,000 ml. of water. The dry pancreas tissue contained about 8% by weight of sodium chloride and about 10% by weight of porcine duodenal tissue. This mixture was extracted by agitation at a temperature of 25° C. for a period of five hours. The extract thereupon formed was separated from the tissue residue by centrifugation, and the volume of extract obtained was 1800 ml.

A carboxylic acid type resin (XE–97), in the amount of 180 gms., was equilibrated with a 0.05 M acetate buffer, containing sodium acetate and acetic acid, at a pH of 4.7. The equilibrated resin was mixed with 720 ml. of the pancreatic extract and 4950 ml. of water. The resulting mixture was stirred at a temperature of 25° C. for a period of 90 minutes, and thereafter the resin was separated from the supernatant liquid by centrifugation. The separated resin was washed with water two times, each wash being obtained with 1800 ml. of water. The wash waters were separated from the resin by centrifugation and discarded. The washed resin was mixed with 760 ml. of pH 4.7, 2 M sodium acetate-acetic acid buffer solution, and the resulting mixture was agitated for a period of 90 minutes at a temperature of 25° C. The eluate was separated from the resin by centrifugation, and thereupon 690 ml. of eluate was recovered having a protein concentration of 2.4 mgms. per ml. as determined by the Folin micro protein method. This eluate, in the amount of 675 ml., was mixed with 393 gms. of solid ammonium sulphate, and agitated at a temperature of 25° C. for a period of one hour to obtain dissolution of the ammonium sulphate. The precipitate thereupon formed was separated from the supernatant liquid by filtration. The separated precipitate was dissolved in water and diluted with water to a volume of 100 cc. A portion of the resulting solution, 45 cc., was lyophilized. This lyophilized aliquot weighed 5.1 gms., and the total yield of elastase product was calculated to be 11.3 gms. This product contained about 5% by weight of protein.

The activity of the dry product on elastin substrate was 0.25 unit per mg. of solids or 9.1 units per mg. of protein.

Example II

A dried, defatted and comminuted pancreas product, containing about 8% by weight of sodium chloride and 10% by weight of porcine duodenal tissue, in the amount of 800 gms., was mixed with 4000 ml. of water. This mixture was agitated for a period of 3 hours at a temperature of 25° C. The extract thereupon formed was separated from the tissue residue by centrifugation, and the volume of extract thereby obtained was 3700 ml.

A carboxylic acid type resin (XE–97), in the amount of 200 gms., was equilibrated with a pH 4.7, 0.05 M sodium acetate-acetic acid buffer solution. The equilibrated resin was mixed with 800 ml. of the pancreatic extract and 5450 ml. of water. This mixture was agitated for a period of 135 minutes at a temperature of 25° C. The resin was separated from the supernatant liquid by centrifugation, and the supernatant liquid was discarded. Then, the resin was washed two times, each wash being obtained with 2000 ml. of water. The washes were separated from the resin by centrifugation and discarded. The washed resin was eluted with 800 ml. of 4.7, 2 M sodium acetate-acetic acid buffer solution by agitation at a temperature of 25° C. for a period of 135 minutes. The resulting eluate was separated from the resin by centrifugation and the resin was discarded. The eluate was obtained in a volume of 750 ml., containing 3.1 mg. of protein per ml.

A portion of this eluate, in the amount of 720 ml. was mixed with 341 gms. of solid ammonium sulphate, and the resulting mixture was agitated at a temperature of 25° C. for a period of one hour. The precipitate thereupon formed was settled at a temperature of 0° C., and separated from the supernatant liquid by centrifugation. The precipitate was dried by lyophilization. The dry product was obtained in a yield of 10.98 gms. containing about 5% by weight of protein. The activity of this product on elastin substrate was 0.34 unit per mg. solids or 6.0 units per mg. of protein.

A second portion of the eluate, in the amount of 700 ml. was mixed with 332 gm. of solid ammonium sulphate, and the mixture was agitated at a temperature of 25° C. for a period of one hour. The precipitate thereupon formed was settled at a temperature of 0° C., and separated from the supernatant liquid by centrifugation. The precipitate was dehydrated by lyophilization. The dry product was obtained in a yield of 14.35 gms., containing about 5% by weight of protein. The activity of this product on elastin substrate was 0.29 unit per mg. of solids or 7.4 units per mg. of protein.

Example III

Comminuted, defatted and dried pancreas tissue, containing about 8% by weight of sodium chloride, and 10% by weight of porcine duodenal tissue, in the amount of 400 gms., was mixed with 2000 ml. of water. This mixture was agitated for a period of 4 hours at a temperature of 25° C. The extract thereupon formed was separated from the tissue residue by centrifugation. This pancreatic extract was obtained in a volume of 1530 ml.

A carboxylic acid type resin (XE-97), in the amount of 300 gms., was equilibrated with pH 4.7, 0.05 M sodium acetate-acetic acid buffer solution. The equilibrated resin was mixed with 1200 ml. of the pancreatic extract and 8174 ml. of water, and the resulting mixture was stirred at a temperature of 25° C. Then, the resin was separated from the supernatant liquid, and such supernatant liquid discarded. The resin was washed two times, each wash being obtained with 3000 ml. of water. These washes were separated from the resin by centrifugation, and discarded. The resin was mixed with 1200 ml. of pH 4.7, 2 M sodium acetate-acetic acid buffer solution, and the resulting mixture was agitated at a temperature of 25° C. The eluate thereupon formed was separated from the resin by centrifugation. This eluate was mixed with 498 gms. of solid ammonium sulphate, and the resultant mixture was agitated for a period of one hour at a temperature of 25° C. Thereafter, the mixture was settled at a temperature of 0° C., and the precipitate thereupon formed was separated by centrifugation. This precipitate was dried by lyophilization. The resulting dry product weighed 23.0 gms., containing about 5% by weight of protein. The activity of this product on elastin substrate was 0.27 unit per mg. of solids or 7.4 units per mg. of protein.

The aforementioned eluted resin was mixed with 500 ml. of pH 4.7, 2 M sodium acetate-acetic acid buffer solution. The resulting mixture was agitated at a temperature of 0° C., and thereafter the eluate was separated from the resin by centrifugation. This eluate, which was obtained in a volume of 450 ml., was mixed with 214 gms. of solid ammonium sulphate. The resulting mixture was agitated at a temperature of 25° C. for a period of one hour, and the precipitate thereupon formed was settled at a temperature of 0° C. This precipitate was separated from the supernatant liquid by centrifugation, and such precipitate was dehydrated by lyophilization. The yield of dry product was 6.6 gms., containing about 5% by weight of protein. The activity of this product on elastin substrate was 0.27 unit per mg. of solids on 6.6 units per mg. of protein.

Example IV

Dried, defatted and comminuted pancreas tissue, containing about 8% by weight of sodium chloride, and 10% by weight of porcine duodenal tissue, was mixed with 3600 ml. of water. This mixture was agitated at a temperature of 25° C. for a period of 5 hours. The resulting extract was separated from the tissue residue by centrifugation, and the volume of extract thereby obtained was 3050 ml.

A carboxylic acid type resin (XE-97), in the amount of 700 gms., was equilibrated with pH 4.7, 0.05 M sodium acetate-acetic acid buffer solution. The equilibrated resin was mixed with 2800 ml. of the pancreatic extract and 19,090 ml. of water. This mixture was agitated for a period of 60 minutes at a temperature of 25° C. Then, the resin was separated from the supernatant liquid by centrifugation. This resin was washed two times, each wash being obtained with 7000 ml. of water. These washes were separated from the resin by centrifugation, and discarded. The washed resin was mixed with 3000 ml. of pH 4.7, 2 M ammonium acetate-acetic acid buffer solution, and the resulting mixture was agitated for a period of 60 minutes at a temperature of 25° C. The eluate thereupon formed was separated from the resin by centrifugation. This eluate was obtained in a volume of 2800 ml. containing 3.0 mg. of protein per ml. as determined by the Folin micro protein method.

A portion of this eluate, in the amount of 380 ml. was mixed with 2045 ml. of 95% 3A alcohol. The alcohol was added to the eluate, drop-wise, at a temperature of −5° C., with vigorous agitation. The precipitate thereupon formed was settled at a temperature of −5° C., and such precipitate was separated from the supernatant liquid by centrifugation. The separated precipitate was dried by lyophilization, and obtained in a yield of 0.49 gm. This dry product, which was substantially all protein, was designated A.

A second portion of this eluate, in the amount of 1600 ml., was mixed with 8600 ml. of 95% 3A alcohol. The alcohol was added to the eluate capillary-wise at a temperature of −5° C. with vigorous agitation. The precipitate thereupon formed was settled at a temperature of −5° C., and then separated from the supernatant liquid by centrifugation. This precipitate was dehydrated by lyophilization, and obtained in a yield of 2.6 gms. This dry product, which was substantially all protein, was designated B.

A third portion of the eluate, in the amount of 595 ml. was mixed with 3200 ml. of 95% 3A alcohol. The alcohol was added to the eluate capillary-wise at a temperature of −5° C. with vigorous agitation. The precipitate thus formed was settled at a temperature of −5° C., and separated from the supernatant liquid by centrifugation. This separated precipitate was dehydrated by lyophilization, and the dried product weighed 0.70 gm. This dry product was designated C, and was substantially all protein.

The aforementioned dry products, A and B and C, were combined and mixed to form a uniform pool. The activity of the pooled product on elastin substrate was 10.8 units per mg. of solids.

Example V

The eluted elastase substance obtained according to the method of Example IV was subjected to the following purification procedure:

This elastase eluate, in a volume of 140 ml., was mixed with 965 ml. of water and 996.5 ml. of packed XE-97 resin, containing 35 gms. of dry resin, previously equilibrated according to the method of Example IV.

The resulting mixture was agitated at room temperature for a period of 30 minutes. Then, the supernatant liquid was separated from the resin by centrifugation, and discarded. The separated resin was eluted with 168 ml. of pH 4.7, 2 M ammonium acetate-acetic acid buffer solution.

The resulting eluate was analyzed, and the results were as follows:

| Protein concentration (micro Folin method, mg. per ml.) | 0.246 |
| --- | --- |
| Elastase activity (elastin substrate, units per ml.) | 32.6 |

Thus, the purity of this elastase substance can be calculated as 133 units per mg. of protein.

While in the foregoing specification various embodiments of this invention have been set forth and specific details thereof elaborated for the purpose of illustration, it will be apparent to those skilled in the art that this invention is susceptible to other embodiments and that many of these details can be varied widely without departing from the basic concept and spirit of the invention.

We claim:

1. In a process for preparing an elastolytic enzyme substance, wherein an elastase substance is extracted from elastase-bearing tissue to provide a crude aqueous concentrate thereof, the steps of contacting a weak cation exchanger and aqueous concentrate of said elastase substance at a pH of from 4.5 to 5.0 and an ionic strength of not more than 0.4 to produce an adsorbate of said elastase substance, and eluting said elastase substance from said adsorbate with an aqueous saline solution at a pH of from 4.5 to 5.0 and an ionic strength of at least 0.4.

2. In a method of preparing an elastolytic enzyme substance, wherein elastase-bearing tissue is extracted to form a crude aqueous concentrate of an elastase substance, the steps of contacting the aqueous concentrate of said elastase substance with a weak cation exchanger at a pH of about 4.7 and an ionic strength of about 0.05 to produce an adsorbate of said elastase substance, and eluting said elastase substance from said cation exchanger at a pH of about 4.7 and an ionic strength of between 0.8 and 1.5.

3. The method of claim 2, in which said weak cation exchanger is a carboxylic acid exchange resin.

4. In a process for preparing an elastolytic enzyme substance, wherein elastase-bearing tissue is extracted to form a crude aqueous elastase concentrate, the steps of contacting a weak cation exchanger with a crude aqueous elastase concentrate having a pH of 4.5 to 5.0 and ionic strength of not more than 0.4 to adsorb said elastolytic enzyme thereon, and contacting the adsorbed elastolytic enzyme with an aqueous saline solution having a pH of from 4.5 to 5.0 and an ionic strength of at least 1.0 to elute said elastolytic enzyme from said cation exchanger.

5. In a process for preparing an elastolytic enzyme substance, wherein elastase-bearing tissue is extracted to form a crude aqueous elastase concentrate, the steps of contacting a weak cation exchanger with a crude aqueous elastase concentrate having a pH of from 4.5 to 5.0 and an ionic strength of not more than 0.4 to adsorb said elastolytic enzyme thereon, and contacting the adsorbed elastolytic enzyme with an aqueous saline solution having a pH of 4.7 and an ionic strength of about 2.0 to elute said elastolytic enzyme from said cation exchanger.

6. The process of claim 5 in which said weak cation exchanger is a carboxylic acid exchange resin.

7. The process of claim 5 in which said elastase-bearing tissue is pancreas tissue.

8. In a process for preparing an elastolytic enzyme substance, the step of contacting a weak cation exchanger with an aqueous saline solution at a pH of from 4.5 to 5.0 and an ionic strength of at least 0.4, said weak cation exchanger having an elastase substance adsorbed thereon, and separating the resulting eluate from said weak cation exchanger.

9. In a process for preparing an elastolytic enzyme substance, the step of contacting a weak cation exchanger with an aqueous saline solution having a pH of from 4.5 to 5.0 and an ionic strength of at least 1.0, said weak cation exchanger having elastase adsorbed thereon, whereby said elastase is eluted from said weak cation exchanger.

10. The process of claim 9 in which said weak cation exchanger is a carboxylic acid exchange resin.

11. In a process for preparing an elastolytic enzyme substance, wherein elastase-bearing tissue is extracted to form a crude aqueous concentrate of an elastase substance, the step of contacting a weak cation exchanger with the crude aqueous concentrate of said elastase substance, said aqueous concentrate having a pH of from 4.5 to 5.0 and an ionic strength of about 0.05, whereby an adsorbate of said elastase substance is produced.

12. The process of claim 11 in which said weak cation exchanger is a carboxylic acid exchange resin.

13. The process of claim 11 in which said elastase-bearing tissue is pancreas tissue.

14. In a process for preparing an elastolytic enzyme substance, wherein elastase-bearing tissue is extracted to form a crude aqueous elastase concentrate, the step of contacting a weak cation exchanger with a crude aqueous elastase concentrate having a pH of from 4.5 to 5.0 and an ionic strength of not more than 0.4 to adsorb said elastolytic enzyme onto said cation exchanger.

15. In a process for preparing an elastolytic enzyme substance, the steps of extracting pancreas tissue to obtain a crude aqueous concentrate of an elastase substance, contacting said crude aqueous concentrate with a weak cation exchanger at a pH within the range of 4.5 to 5.0 and an ionic strength of not more than 0.4 to produce an adsorbate of said elastase substance, and contacting said adsorbate with an aqueous saline solution having a pH of from 4.5 to 5.0 and an ionic strength of at least 1.0 to elute said elastase substance from said cation exchanger.

16. The process of claim 15 in which said pancreas tissue is porcine pancreas tissue.

17. In a process for preparing an elastolytic enzyme substance, the steps of extracting a mixture of porcine pancreas tissue and porcine duodenal tissue to obtain a crude aqueous elastase concentrate, contacting a carboxylic acid exchange resin with said aqueous elastase concentrate having a pH of from 4.5 to 5.0 and an ionic strength of not more than 0.4 to adsorb said elastolytic enzyme thereon, and contacting the adsorbed elastolytic enzyme with an aqueous saline solution having a pH of from 4.5 to 5.0 and an ionic strength of about 2.0 to elute said elastolytic enzyme from said carboxylic acid exchange resin.

References Cited in the file of this patent

"Advances in Enzymology," vol. 14, 1953, publ. by Interscience Publ. Inc. (New York), pages 338 to 341 and 400.

"Biochemical Journal," vol. 59, No. 3, March 1955, pages 465 to 471.